Sept. 28, 1971 S. W. NILSSON 3,608,393
PLANETARY BALL SCREW MECHANISM
Filed May 6, 1970 3 Sheets-Sheet 1
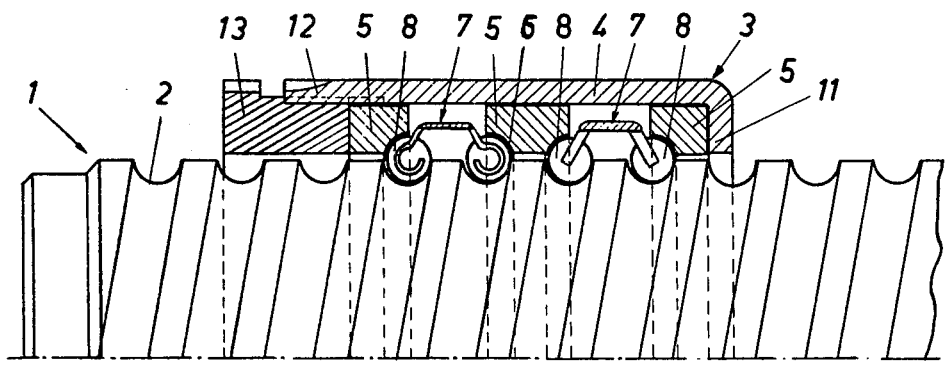
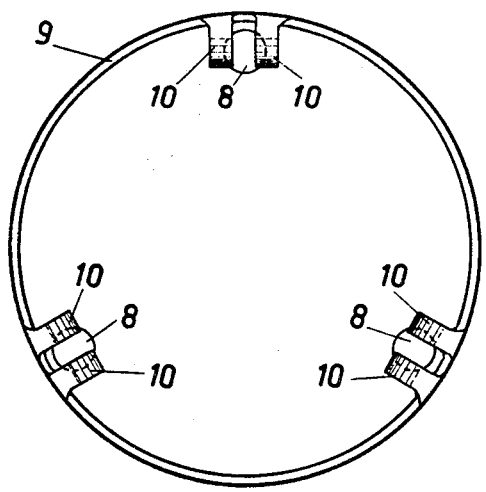
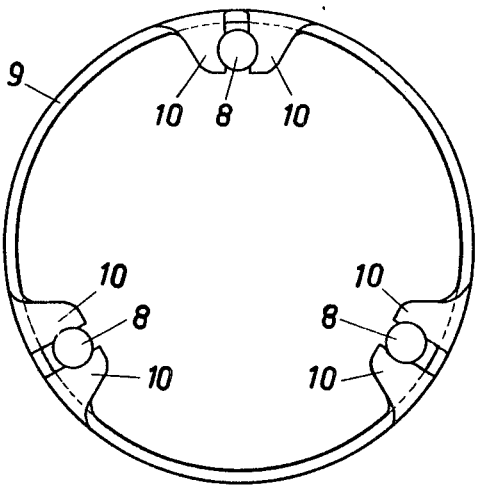
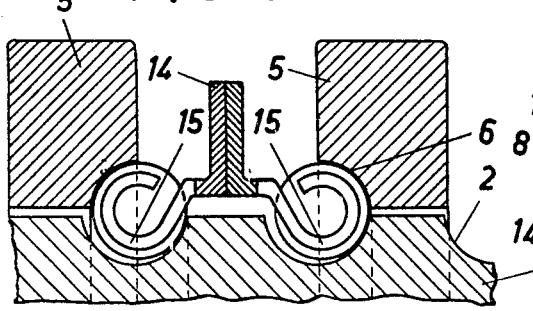
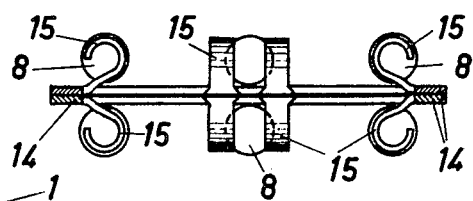
INVENTOR:
SVEN WALTER NILSSON
BY
*Howson & Howson*
ATTYS.

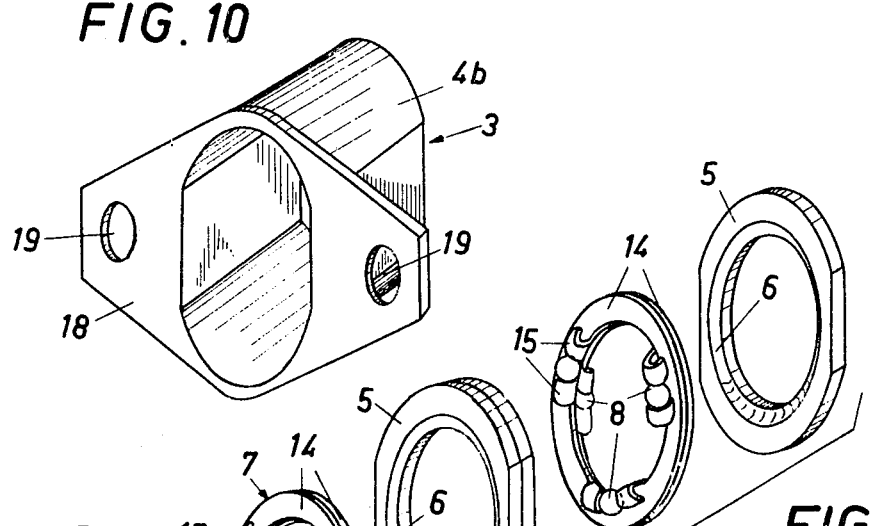
FIG. 10
FIG. 11
FIG. 5
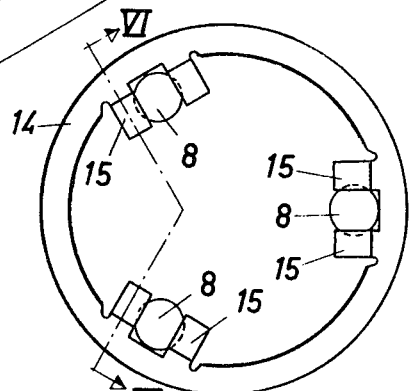
FIG. 9
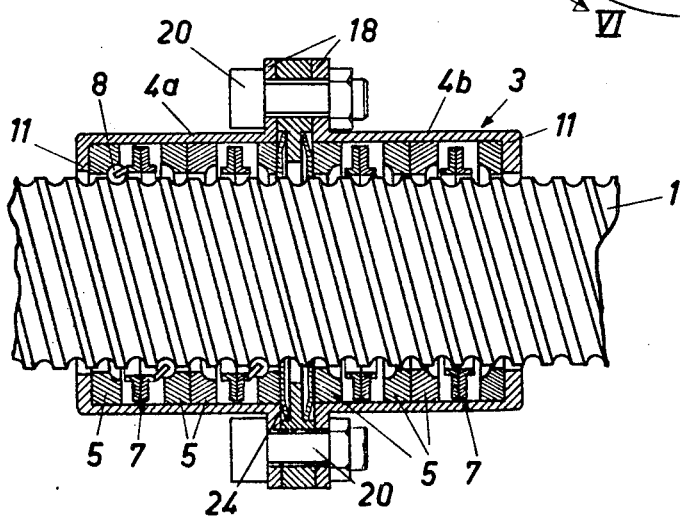
INVENTOR:
SVEN WALTER NILSSON

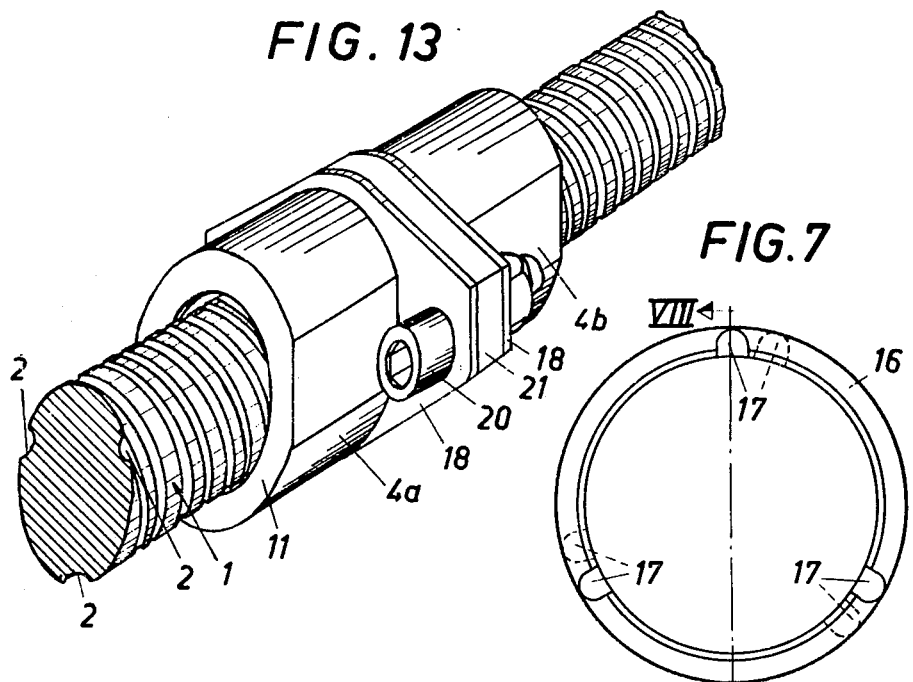
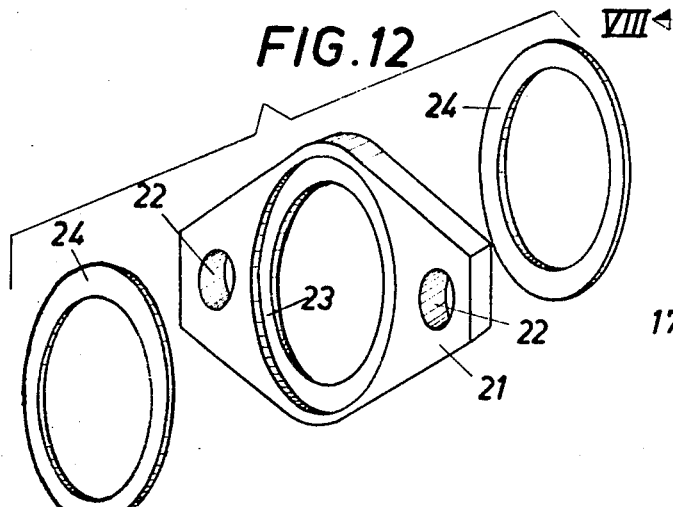
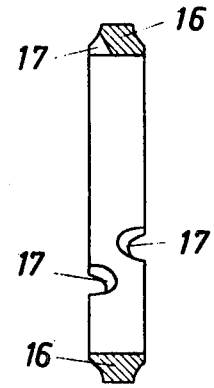

United States Patent Office 3,608,393
Patented Sept. 28, 1971

3,608,393
PLANETARY BALL SCREW MECHANISM
Sven Walter Nilsson, Partille, Sweden, assignor to SKF Industriele Handel-En Ontwikkeling Maatschappij NV, Amsterdam, Netherlands
Filed May 6, 1970, Ser. No. 35,221
Claims priority, application Sweden, May 6, 1969, 6,344/69
Int. Cl. F16h 1/20, 55/22
U.S. Cl. 74—424.8          11 Claims

ABSTRACT OF THE DISCLOSURE

In a planetary ball screw mechanism of the type where the nut is provided with balls mounted in holders fitted between axially displaceable bearing rings, the holders are designed in such a manner they will each, together with the balls mounted therein, keep the adjacent bearing rings apart, which makes it possible to permit the main portion of the holder to extend outwards into the free space formed between said bearing rings. Hereby the clearance between the shaft and the nut may be kept at a minimum, whereby the grooves for the balls may be deep and suited to transfer high loads.

BACKGROUND OF THE INVENTION

The present invention refers to a planetary ball screw mechanism working on a shaft provided with a number of helical grooves and containing a ball nut comprising a number of annular ball holders, each carrying a ball for each groove in the shaft, said balls furthermore cooperating with endless ball races in bearing rings.

With mechanisms of this type, where a rotating movement is transferred into an axial movement, the balls are carried in a holder element of the basic type used in ball bearings of conventional design. A disadvantage with this arrangement is that the holder elements require a certain space between the nut and the shaft, which means that the grooves will have to be comparatively shallow. In this manner the mechanism will transfer restricted loads only, for a certain length of the nut. A further disadvantage with planetary nut mechanisms of known designs is that the possibility of adjusting the ball clearance is very small. This necessitates a high degree of precision during the manufacture which increases the production costs.

SUMMARY OF THE INVENTION

The aim of the present invention is to provide a planetary ball mechanism in which above mentioned disadvantages are eliminated, and in which the ball holders are designed in such a manner that the shaft can be provided with grooves of sufficient depth to provide a 45° contact surface having well defined contact ellipses. The invention is characterized by that two adjacent rows of balls are carried in a common holder unit located in a free space between two bearing rings, which are axially displaceable in relation to each other in a housing.

BRIEF DESCRIPTION OF THE DRAWINGS

FIG. 1 is a longitudinal section through part of a ball nut mechanism according to the invention;

FIGS. 2 and 3 show front views of two types of holder units included in FIG. 1;

FIG. 4 shows on a larger scale an axial section through a part of a mechanism including a holder unit of further modified form.

FIGS. 5 and 6 show a front view, and a section along line VI—VI in FIG. 5, respectively, of the holder unit shown in FIG. 4;

FIGS. 7 and 8 show a further modification of the holder unit as viewed from the front and in a section along line VIII—VIII in FIG. 7, respectively;

FIG. 9 shows a longitudinal section through two interconnected ball nuts;

FIGS. 10, 11 and 12 show perspective views of details contained in the mechanism according to FIG. 9; and FIG. 13 shows a perspective view of the mechanism according to FIG. 9.

DESCRIPTION OF THE PREFERRED EMBODIMENTS

In all embodiments shown the same details have been denoted by the same legends. A shaft is thus denoted by 1. This shaft may be solid or tubular, and is along its external envelop surface provided with three helical grooves 2, each having a cross-section forming a part of a circle. This shaft is surrounded by a nut 3 composed of a sleeve-shaped housing 4, and a number of bearing rings 5, each provided with one, or two, end-less ball races 6 each having a cross-section forming part of a circle. The bearing rings 5 are axially displaceable within the housing 3, but are secured against turning in relation to the same. A ball holder unit 7 is fitted between each a pair of adjacent rings, each unit preferably being designed to carry two rows of balls, each cooperating with a ball-race 6 in a bearing ring. The number of balls 8 in each row corresponds to the number of grooves 2 in the shaft 1, in the present case three rows. The holder units shown in FIG. 1 are of two different types, which are illustrated in FIGS. 2 and 3 respectively. Both units basically consist of a tubular body 9, from which ears 10 are pairwise bent inwards in 45°. A ball 8 is mounted in each pair of ears. According to FIG. 2 the ears are loop-formed to provide two annular seats for each ball 8, while according to the embodiment shown in FIG. 3 the ears 10 are each formed with a part-circular seat, between which a ball 8 is freely rotatable.

By mounting the holder unit between two bearing rings it is possible to make the grooves 2 in the shaft 1, as well as the ball races in the bearing rings comparatively deep, as the clearance between the shaft and the bearing rings may be small. Hereby a 45° angular contact is obtained, with well defined contact ellipses, which considerably increases the bearing capacity of the mechanism. The nut housing 3 is at one end provided with an annular end plate 11, which serves as an axial stop for the adjacent single-race bearing ring 5. At the end of the nut housing remote from said end plate the housing is provided with internal threads 12, which are adapted to cooperate with an annular setting member 13, by means of which the position of the adjacent bearing ring 5 may be axilaly adjusted. A setting force applied to the outer-most bearing ring 5 will by way of the balls 8 and the holder units 7 be transferred to the other bearing rings, whereby the holder units, as well as the balls, will be subjected to ascertain by biasing force. The annular screw member 13 may be locked by any suitable means, not shown, whereby the biasing force will be maintained.

The holder unit shown in FIGS. 4–6 is of a somewhat modified design, which contrary to the design according to FIGS. 1 and 3 consists of a ring, or washer 14 arranged radially in relation to the shaft 1. The washer 14 is in the same manner as the cylindrical sleeve 9 provided with ears 15 arranged in pairs and bent away from the washer 14 in order to form loops which provide annular seats for the ball 8. As shown in FIGS. 4 and 6 two similar washers 14 are arranged back to back and are preferably interconnected by means of a spot welding.

With the design according to FIGS. 7 and 8 the holder unit 7 consists of a ring 16 of synthetic resin, which in each side surface is provided with pockets 17, each adapted to receive a ball 8. The ball pockets 17 are formed in such a manner, that they will each enclose about a quarter of the spherical envelope surface of the ball. It is of course possible to manufacture the ball holder units in other materials, for instance a bearing bronze.

FIG. 9 shows a ball nut mechanism consisting of two interconnected ball nuts, the individual components of which are illustrated in FIGS. 10–12. The housing 3 consists of two similar halves 4a and 4b, which at the end remote from the end-plate 11 is each provided with an external flange 18. This is provided with bores 19 for connecting members, such as screws 20, rivets or the like. Both halves 4a and 4b of the housing are designed with a non-circular internal passage in which the bearing rings 5 having similar external shape are fitted. Hereby the bearing rings are secured against turning within the housing, but have a possibility for axial displacement. Between the two halves 4a and 4b a washer 21, having the same contour as the flanges 18, is fitted, said washer being provided with the bores 22 opposite the two bores 19. A recess 23 is formed on each side surface of the washer 21 around the opening therein for the shaft 1, said recesses being each designed to receive a spring washer 24. These washers are fitted in such a manner, that they exert an outwardly directed force, which biases the bearing rings 5 towards the pertaining end-plate by way of the ball holder units. Hereby a biasing of the balls within certain limits, and an equalization of possible differences in clearance is obtained.

A somewhat simpler embodiment than the one shown in FIGS. 9–13 may have a housing 4 formed by a single sleeve, which at one end is open during the assembly, and having excess length in such a manner that this open end, after the completed assembly, may be deformed inwards to provide a second end-plate 11 of the housing. The desired biasing of the balls will here be obtained by means of spring washers or the like resting against the insides of the respective end-plates 11.

The invention is not limited to the embodiments above shown and described, but may be varied in many ways within the scope of the appended claims.

What I claim is:

1. In a planetary ball screw mechanism consisting of a nut working on a shaft provided with more than one helical groove, and where the nut has a housing enclosing a number of ball holders supporting rows of balls, each row including one ball for each helical groove in the shaft, as well as bearing rings having end-less tracks for the balls, the improvement that the bearing rings are axially displaceable within the housing, and each ball holder carries two full rows of balls and is designed to extend from the shaft outwards between two adjacent bearing rings to keep said rings apart through the intermediation of the balls carried by the holder.

2. The mechanism according to claim 1, in which one row of balls is located at each side of a radial middle plane through the holder.

3. The mechanism according to claim 1 in which the positions of the bearing rings and the holders are axially adjustable within the housing by means of a setting device.

4. The mechanism according to claim 3 in which the setting device includes a threaded annular member adapted to be screwed into the housing.

5. The mechanism according to claim 3 in which the setting device includes at least one resilient element—for instance a spring washer—mounted to be supported by the housing and by one of the bearing rings, respectively.

6. The mechanism according to claim 1 in which the bearing rings are secured against turning in relation to the nut housing.

7. The mechanism according to claim 6 in which the nut housing has a non-circular internal passage and the external shape of the bearing rings conforms to the cross-section of said passage.

8. The mechanism according to claim 1 in which each holder includes a cylindrical sleeve, from the body of which inwardly turned tongues are arranged in pairs, each pair rotatably carrying a ball.

9. The mechanism according to claim 1 in which each holder includes a plane annular washer, mounted radially in relation to the shaft and from the body of which loop-formed tongues extend in pairs, each pair rotatably carrying a ball.

10. The mechanism according to claim 1 in which each holder unit consists of an annular element, which is designed with a clearance to fit into the space between two bearing rings, said annular element being provided with pockets, each designed to enclose about one quarter of the envelope surface of a ball.

11. The mechanism according to claim 10 in which the holder unit is made of synthetic resin having a low coefficient of friction.

References Cited

UNITED STATES PATENTS

| | | | |
|---|---|---|---|
| 2,751,789 | 6/1956 | Orenick | 74—424.8X |
| 2,924,112 | 2/1960 | Martens | 74—424.8 |
| 2,982,145 | 5/1961 | Orner | 74—424.8 |
| 3,003,362 | 10/1961 | Martens | 74—424.8 |
| 3,184,987 | 5/1965 | Beatty | 74—459X |
| 3,296,880 | 1/1967 | Maroth | 74—459X |
| 3,447,394 | 6/1969 | Wagner et al. | 74—424.8 |

ARTHUR T. McKEON, Primary Examiner

U.S. Cl. X.R.

74—459